United States Patent [19]

Moriguchi et al.

[11] Patent Number: 4,510,506
[45] Date of Patent: Apr. 9, 1985

[54] RECORDING APPARATUS

[75] Inventors: Haruhiko Moriguchi; Fujio Moriguchi; Takashi Ohmori, all of Kanagawa, Japan

[73] Assignee: Fuji Xerox Co., Ltd., Tokyo, Japan

[21] Appl. No.: 440,055

[22] Filed: Nov. 8, 1982

[30] Foreign Application Priority Data

Nov. 6, 1981 [JP] Japan .............................. 56-177131

[51] Int. Cl.³ .................... G01D 15/10; G01D 15/24
[52] U.S. Cl. ............................. 346/76 PH; 346/136; 400/583.4; 400/120
[58] Field of Search .................... 346/76 PH, 136; 400/583.4, 120

[56] References Cited

U.S. PATENT DOCUMENTS

| 3,452,853 | 7/1969 | Mabon | 400/583.4 |
| 3,511,354 | 12/1967 | Barcomb | 400/583.4 |
| 4,246,587 | 1/1981 | Reilly | 346/76 PH |
| 4,391,535 | 7/1983 | Palmer | 346/76 PH |
| 4,407,003 | 9/1983 | Fukui | 346/76 PH |

Primary Examiner—E. A. Goldberg
Assistant Examiner—Mark Reinhart
Attorney, Agent, or Firm—Sughrue, Mion, Zinn, Macpeaks & Seas

[57] ABSTRACT

A recording apparatus in which recording is made several times each line in a partitioning manner part after part on each recording line for which there exists picture data to be printed. The system determines whether there exists picture data to be printed on each line or not. A sub-scanning speed per line is set such that when the determination is made that one or more successive lines immediately before a recording line for which there exists picture data to be printed is or are an entire blank line or successive entire blank lines for which there exists no picture data to be printed, the sub-scanning speed for the entire blank line or successive ones of the successive entire blank lines adjacent to the recording line is selected to be substantially equal to that at the recording line. The sub-scanning speed of other entire blank line or lines for which there exists no picture data is selected to be a speed which is sufficiently higher than that for the recording line.

12 Claims, 5 Drawing Figures

RECORDING APPARATUS

BACKGROUND OF THE INVENTION

This invention relates to a recording apparatus in which a sheet of recording paper is intermittently moved or sub-scanned so that recording is made line after line.

In many recording systems such as printers or facsimile equipment using a thermal recording head, the thermal recording of one line is attained in discrete portions by driving the thermal head several times because of the limitations of the capacity of the electric source or the like (hereinafter referred to as a "one-line-partitioning printing system"). In such a recording apparatus, the recording has to be attained on each line while the recording paper is stopped, otherwise the printed dots on the recording paper may be mispositioned or replaced in the sub-scanning or moving direction of the recording, resulting in the deterioration in quality of the recorded picture. For this reason, in the above-mentioned recording apparatus, a pulse motor is used in a mechanism for intermittently moving or sub-scanning the recording paper to move the recording paper intermittently line a after line and the thermal head is driven during stoppage of the recording paper.

A so-called blank line skipping system in which sub-scanning is made at a high speed on a line for which there exists no picture information to be recorded (hereinafter referred to as an "entire white line") is also utilized in the recording system of the type as mentioned above in accordance with the demand for high speed recording. In the recording apparatus in which the blank line skipping system is employed, however, there has been a problem that printed dots may be mispositioned or replaced at the first recording line after a blank line skipping.

FIG. 1 is a schematic diagram for explaining the cause of such displacement of the printed dots. In FIG. 1, the y-axis represents the distance of movement of the recording paper and each of the sections defined by dotted lines perpendicular to the y-axis represents the line interval of the recording paper. The x-axis represents the lapse of recording time and each of the sections defined by dotted lines perpendicular to the x-axis represents the processing speed per line (sum of the time during which the recording paper moves and the time during which the recording paper rests so that the recording operation is effected). In FIG. 1, lines $l_1$ and $l_2$ are entire blank lines and lines $l_3$ to $l_5$ are recording lines on which a recording has to be made.

In FIG. 1, the processing speed is a high speed one of 2.5 msec/line at each of the entire white lines $l_1$ and $l_2$ by employing the blank line skipping system, while a lowered speed of 5.0 msec/line at each of the lines $l_3$ to $l_5$ is used because there is black picture information to be recorded. The sub-scanning of the recording paper is effectuated intermittently and the recording is made within a period of time T at the rear part of the sub-scanning period. Ordinarily, the period T is set as a maximum value which is large enough to stop the recording paper at a predetermined sub-scanning speed, responding to the demand of speeding up the recording. At the third line $l_3$, however, the sub-scanning mechanism cannot sufficiently follow the sudden decrease of the rotary speed of the pulse motor due to the decrease of the sub-scanning speed. Thus, at the line $l_3$, the stoppage period t becomes shorter than the recording period T so that a part of recording is made during the traveling of the recording paper. This causes the displacement of the printed dots, resulting in deterioration in quality of the recorded picture.

SUMMARY OF INVENTION

An object of the present invention is to provide and eliminate the drawbacks as mentioned above, in a recording system which employs the blank line skipping system and the one-line-partitioning recording system.

Another object of this invention is to provide a recording system in which the displacement of printed dots is prevented from occurring in recording at every recording line.

According to this invention, the processing speed of each of a predetermined number of entire blank lines located immediately before a recording line is set to be equal to that of the recording line. This avoids an abrupt change in the sub-scanning speed at the transition from an entire blank line to a recording line. Consequently, the above-mentioned objects of the present invention may be attained.

A preferred embodiment of the present invention will be described hereunder by referring to the drawing and the description of the preferred embodiment that follows.

DESCRIPTION OF THE PREFERRED EMBODIMENT

Figure 2:
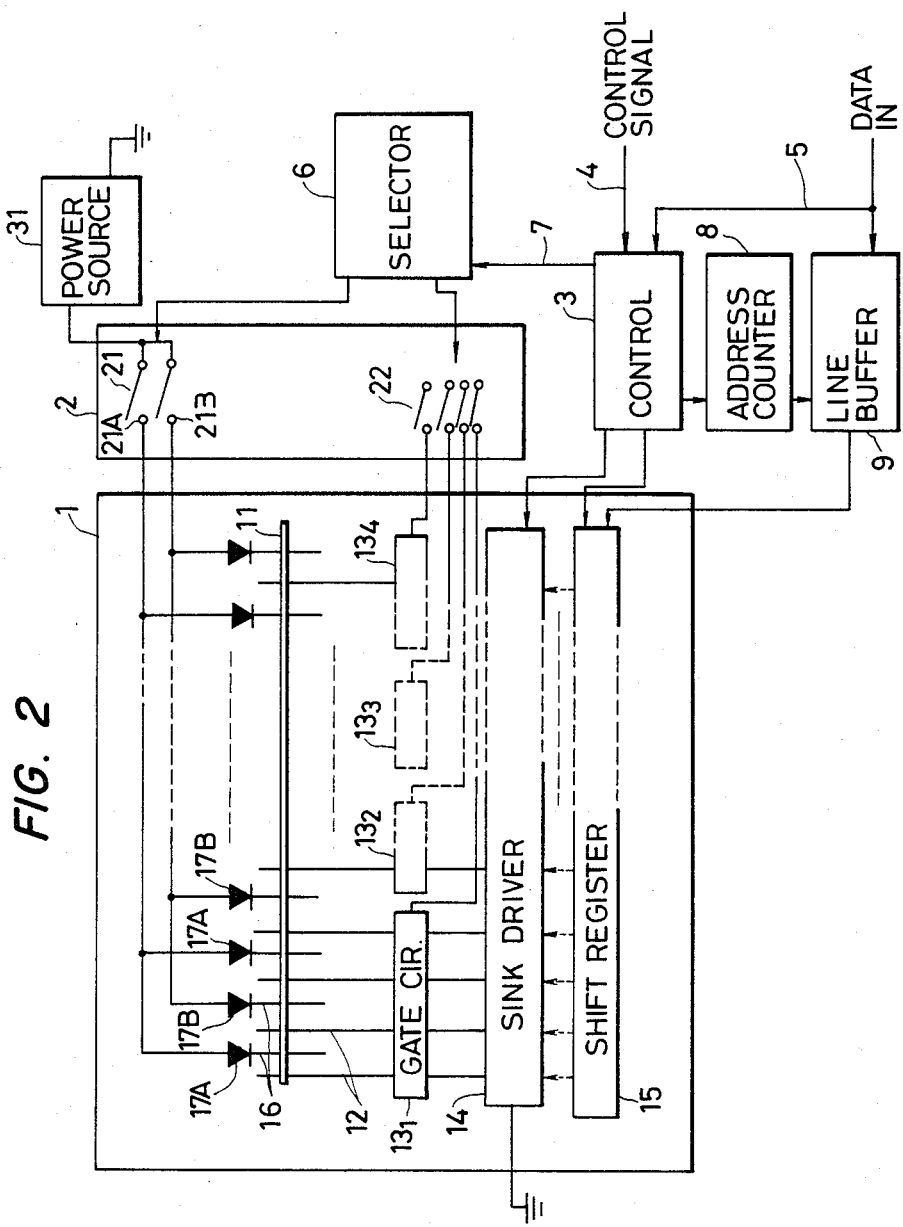
FIG. 2 is a circuit block diagram of an embodiment of the recording apparatus according to the present invention.

Referring now to FIG. 2, a schematic diagram illustrating the general configuration of a preferred embodiment of the recording apparatus according to the present invention is shown. The recording apparatus comprises a thermal recording head 1 for applying thermal pulses to a sheet of thermosensitive recording paper or a thermal transfer recording medium to effectuate thermal recording thereonto. The thermal head 1 is provided with slender heating elements 11 to which numbers of lead electrodes 12 are connected at predetermined intervals at one of their respective ends. The lead electrodes 12 are arranged in groups of four and the respective other ends of the lead electrodes 12 are connected to a sink driver 14 through corresponding gate circuits $13_1$ to $13_4$. Corresponding to the respective lead electrodes 12, parallel output terminals of a shift register 15 are connected to the sink driver 14.

Lead electrodes 16 are connected to the heating elements 11 at the above-mentioned intervals at the respective central point of adjacent ones of the first-mentioned lead electrodes 12. Of the lead electrodes, those constituting an odd number counting from one end (right end in FIG. 2) of the heating elements 11, are commonly connected through respectively corresponding diodes 17A to one of two output side contacts 21A of a first change-over switch 21 in a source driver 2. The lead electrodes of an even number are commonly connected through respectively corresponding diodes 17B to the other output side contact 21B of the first change-over switch 21. The source driver 2 further comprises a second change-over switch 22 for controlling the operation of the gate circuits $13_1$ to $13_4$ in the thermal head.

A control unit 3 provided in the recording apparatus is supplied with a control signal 4 for controlling the apparatus and data of picture 5 to be recorded and applies a control signal 7 to a selector 6 in accordance with the rate of black signals (signals to be printed) in the picture data of one line. The control unit 3 controls also an address counter 8 so as to cause a line buffer unit 9 to operate in accordance with the number of lines counted by the address counter 8. The line buffer unit 9 is supplied with the picture data 5 so that the picture data for the line indicated by the address counter 8 is supplied to the shift register 15 in the thermal recording head 15.

A serial picture signal for one line received by the shift register 15 is converted into a parallel picture signal and applied to the sink driver 14. The sink driver 14 is a kind of switching circuit and grounds the lead electrodes 12 corresponding to black picture data through the gate circuits $13_1$ to $13_4$.

When there is a small amount of black picture data for one line, the second change-over switch 22 causes the respective gates of all the gate circuits $13_1$ to $13_4$ to open in response to the control signal 7. In this case, he first change-over switch 21 having its input contact connected to a power source 31 alternately selects its two output contacts 21A and 21B so that the heating elements 11 are subjected to partitioned driving twice, part after part, for recording onto the line. In the case where a large quantity of black picture data exists for one line, the second change-over switch 22 causes the respective gates of the four gate circuits $13_1$ to $13_4$ to successively alternatively open in response to the control signal 7. In this case, the heating elements 11 are subjected to partitioned driving eight times, part after part, for recording onto the line, with the aid of the above-mentioned operation of the first change-over switch 21. If there is no black picture data for one line, the first change-over switch separates the lead wire 16 from the power source 31. In this case, thermal recording is not carried out.

Figure 3:
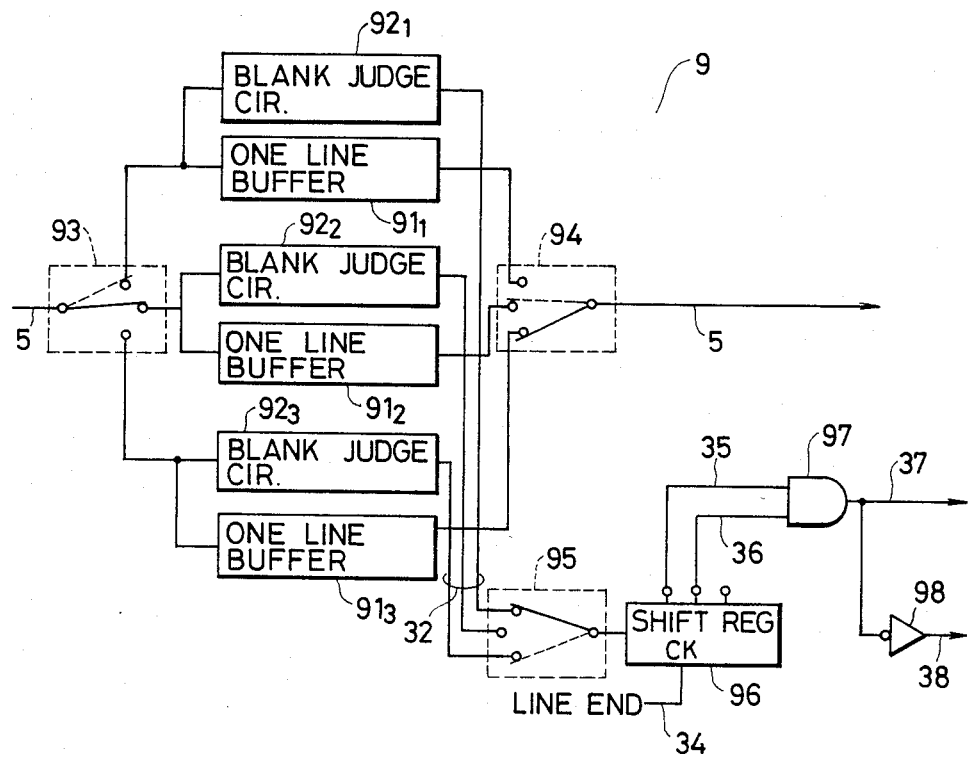
FIG. 3 is a block diagram particularly showing the configuration of the line buffer unit in the recording apparatus of FIG. 2.

FIG. 3 particularly shows the contents of the line buffer unit 9 in the recording apparatus. The line buffer unit 9 is provided with three one-line buffers $91_1$ to $91_3$ for storing a picture data for one line and three entire blank judgment circuits $92_1$ to $92_2$ for determining whether the picture data is entirely blank or not. The respective inputs of the one-line buffers $91_1$ to $91_3$ and entire blank judgment circuits $92_1$ to $92_3$ are connected to a first line-indicating switch 93 so that the successive lines of picture data 5 are successively supplied to buffers $91_1$ to $91_3$ and judgment circuits $92_1$ to $92_3$ in response to the indication of the address counter 8 (FIG. 2). The respective outputs of the three one-line buffers $91_1$ to $91_3$ are connected to a second line-indication switch 94 so that successive lines of picture data 5 are successively supplied to the shift register 15 (FIG. 2) in response to the indication of the address counter 8.

Further, the respective outputs of the first to third entire blank judgment circuits are connected to a third line indication switch 95 so that a judgment signal is supplied for every line of picture data to a three-bit shifter register 96 in response to the indication of the address counter. The three-bit shift register 96 is supplied with a line end signal 34 as a clock signal for indicating the timing of the end of each line. Output signals 35 and 36 respectively produced from the first and second output stages of the three-bit shift register 96 are applied to a two-input AND circuit 97 so that a high speed skipping signal 37 is produced when the output of the AND circuit 97 is at a high level and a normal sub-scanning signal 38 is produced through an inverter 98 when the output of the AND circuit 97 is at a low level. The high speed skipping signal 37 and the normal sub-scanning signal 38 are applied to a motor drive control circuit (not shown).

Assume now that the respective lines $l_0$ to $l_5$ to be recorded in the recording apparatus are as follows:

$l_0$: recording line;

$l_1$, $l_2$: entire blank lines; and $l_3$ to $l_5$: recording lines.

Figure 4:
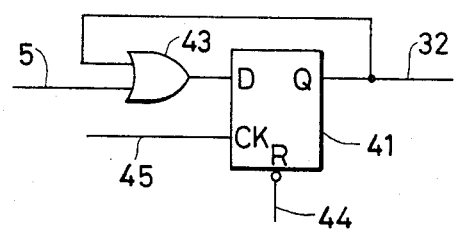
FIG. 4 is a block diagram of each entire blank judgment circuit in the line buffer unit of FIG. 3.

Assume first that a picture data 5 for the zeroth line 10 is applied to the first line-indication switch 93. In this status, the first line-indication switch 93 has selected the first one-line buffer 91, and the first entire blank judgment circuit $92_1$ as shown by dotted line in FIG. 3. The first one-line buffer $91_1$ can store picture data 5 for one line. The contents of each of the entire blank judgment circuits $92_1$ to $92_3$ are shown in FIG. 4. In each of the circuits $92_1$ to $92_3$, the judgment signal 32 produced at an output terminal Q of a flip-flop circuit 41 and the picture data 5 are ORed in an OR circuit 43 which applies in turn its ORed output to an input terminal D of the flip-flop circuit 41. Prior to the application of picture data 5, a line initial signal 44 is applied to a reset terminal of the flip-flop circuit 41 to reset it. Picture data 5 is inputted in response to a video clock 45 synchronized therewith. In each of the entire blank judgment circuits $92_1$ to $92_3$, a judgment signal 32 of low level is produced from the output terminal Q of the flip-flop 41.

Assume now that the first line-indication switch 93 has selected the second one-line buffer $91_2$ and the second entire blank judgment circuit $92_2$ to supply the picture data for the first line $l_1$, as shown by solid line in FIG. 3. At this step, the third line-indication switch 95 is connected to the first entire judgment circuit $92_1$ has shown by solid line in the drawing. In response to a line end signal 34 indicating the completion of the line $l_0$, the judgment signal 32 is applied to the three-bit shift register 96, causing the first output signal 35 to be low.

Next, at the step where the first line-indication switch 93 has selected the third one-line buffer $91_3$ and the third entire blank judgment circuit $92_3$, a judgment signal 32 of high level is applied to the three-bit shift register 96 from the second entire judgment circuit $92_2$ as a signal representing the result of judgment about the picture data for the first line $l_1$, with the result that the first output signal becomes high and the second output signal becomes low. At this time, the second line-indication switch 94 has selected the first one-line buffer $91_1$ and the picture data for the zeroth line $l_0$ is supplied to the thermal recording head 1. In this situation, a normal speed sub-scanning signal 38 is produced from the inverter 98. Accordingly, the recording on the zeroth line 1, which is a recording line, is attained at the processing speed of 2.5 msec/line.

At the step where the first line-indication switch 93 has selected the first one-line buffer 91₁ and the first entire blank judgment circuit 92₁, judgment signal 32 of high level is applied to the three-bit shift register 96 from the third entire white judgment circuit 92₃ as a signal representing the result of judgment about the picture data for the second line l₂. Consequently, both the first and second output signals 35 and 36 become high. At this time, the second line-indication switch 94 has selected the second one-line buffer 91₂ and the picture data for the first line l₁ is supplied to the thermal recording head 1. At this time, a high speed skipping signal 37 is produced from the AND circuit 87 and blank line skipping is made on the first line l₁, which is an entire blank line, with the processing speed of 2.5 msec/line.

In the step where the first line-indication switch 93 has selected the second line buffer 91₂ and the second entire blank judgment circuit 92₂, a judgment signal 32 of low level, caused as the result of judgment about the picture data for the third line l₃, is applied from the first entire blank judgment circuit 92₁ to the three-bit shift register 96. As a result, the picture data for the second line l₂, which is an entire blank line, is supplied to the thermal recording head 1 and the recording paper is sub-scanned at the processing speed of 5.0 msec/line without recording the picture data supplied to the thermal recording head 1.

Figure 1:
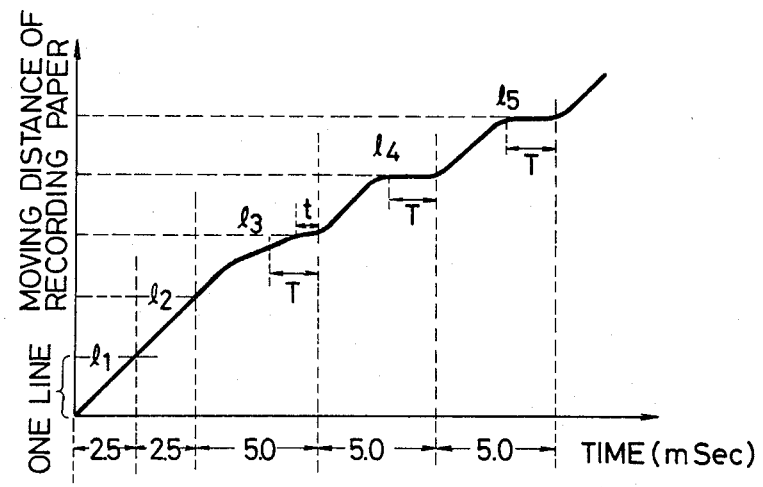
FIG. 1 is a graph showing the relation between the distance of recording paper movement and the lapse of time.
Figure 5:
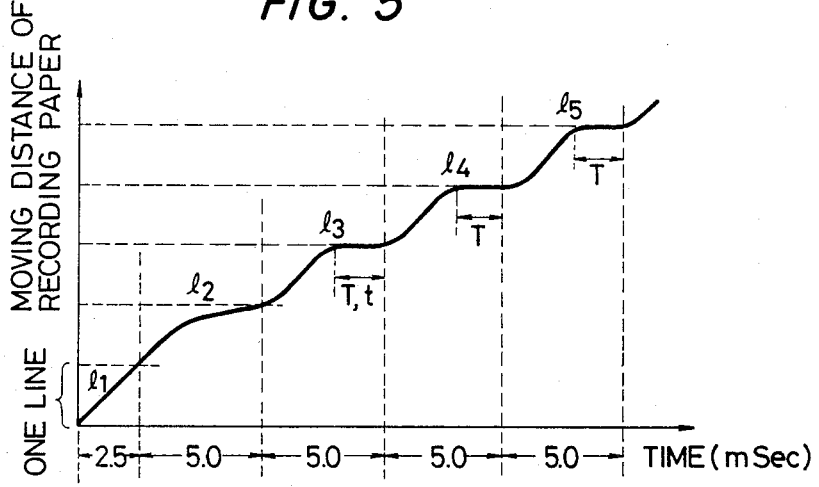
FIG. 5 is a graph showing the relation between the distance of the recording paper movement and the lapse of time of recording operation.

Thus, the high speed skipping operation is ended starting with a blank line just preceding a line having data to be recorded. FIG. 5 corresponds to FIG. 1 and shows the relation between the moving distance of the recording paper and the lapse of time in this embodiment. Since the recording paper is moved at the normal speed beginning with the line one line before a line on which recording has to be made, it becomes possible to make the recording paper stoppage period t equal to the recording period T so that the displacement of printed dots may be prevented. Further, since entire blank lines exist, in many cases, in a successive status, the increase in the total time for the whole recording operation is too slight to cause any problem even if the recording time for several blank lines is substantially equal to that for lines having data to be recorded.

As explained herein in detail, according to the present invention, it is possible to obtain high quality recorded pictures only by changing the electrical system without altering the mechanical aspects of the device.

The present invention can be applied to an optical recording apparatus using an LED array and an electrostatic recording apparatus using multi-stylus. Hence, while the above description has been made, vis-a-vis the embodiment of the recording apparatus using a thermal recording head, the invention is not so limited.

What is claimed is:

1. In a printer of the type in which successive lines of data are printed successively by a print means onto a print medium, the direction on said medium from line to successive lines being the sub-scanning direction, said printer further being of the type having means for scanning said print means relative to said print medium in said sub-scanning direction at a first normal speed and a second faster than normal speed for printing lines having data to be printed and for skipping lines having no data to be printed, respectively, the improvement comprising,
   first means responsive to a plurality of successive lines of data for detecting for each said line of data the presence or absence of data to be printed, second means responsive to said first means for causing said scanning means to scan in said sub-scanning direction at said second speed for each line having an absence of data which is followed by a predetermined number of successive lines having an absence of data, and to scan at said first speed for all other lines of data.

2. A printer as claimed in claim 1 wherein said print means is a thermal recording head having an array of thermal recording electrodes, said printer further comprising logic means for applying serial picture data from said determining means to said recording electrodes in a parallel manner.

3. A printer as claimed in claim 1 wherein said first means comprises,
   n line data detecting circuits for detecting the absence of data to be recorded in a line of data applied thereto and outputting a data absent signal when said line of data does not include any data to be recorded,
   first switch means for sequentially applying successive lines of data to successive ones of said line data detecting circuits, the first of said detecting circuits following the last to provide continuous cycling of the application of lines of data to said detecting circuits.

4. A printer as claimed in claim 3 wherein said second means comprises,
   storage means for storing and subsequently reading out to said print means the lines of data, and
   monitor means, connected to said n line data detecting circuits, for monitoring the presence of data absent signals for the line currently being read out to said print means and for said predetermined number of successive lines, said monitoring means providing a first speed control output when any one of said data lines monitored contains data to be recorded and a second speed control output when all said data lines monitored have no data to be recorded.

5. A printer as claimed in claim 4 wherein said second means further comprises,
   second switch means successively applying the outputs of said n line data detecting circuits to said monitor means, said second switch means being one position behind said first switch means whereby when the n line data detecting circuit is connected to apply line data thereto, said (n-1)th data detecting circuit is connected by said second switch to said monitoring circuit.

6. A printer as claimed in claim 5, wherein said monitor means comprises a shift register receiving the output of said n line data detecting means via said second switch means, a line end signal input to said shift register, said shift register producing first and second output responsive to successive stages therein, an AND circuit receiving said outputs and producing a signal indicative of said second faster than normal speed in one output state and producing a signal indicative of said first normal speed in a second output state.

7. A printer as claimed in claim 5 wherein said storage means comprises n buffer storage means, each for storing a single line of data, connected to said first switch means to sequentially receive said lines of data, and
   wherein said second means further comprises a third switch means for sequentially reading out said n buffer storage means, said third switch means being said predetermined number of switch positions behind said first switch.

8. A printer as claimed in claim 1 wherein said predetermined number is one.

9. A printer as claimed in claim 3 wherein said predetermined number is one.

10. A printer as claimed in claim 4 wherein said predetermined number is one.

11. A printer as claimed in claim 5 wherein said predetermined number is one.

12. A printer as claimed in claim 7 wherein said predetermined number is one.

* * * * *